Patented Feb. 9, 1937

2,070,351

UNITED STATES PATENT OFFICE 2,070,351

MANUFACTURE OF ISATIN COMPOUNDS USEFUL FOR PROTECTION AGAINST MOTHS

Jakob Bindler, Basel, Switzerland, assignor to the firm of J. R. Geigy S. A., Basel, Switzerland No Drawing. Application July 27, 1933, Serial No. 682,531. In Switzerland September 3, 1932

8 Claims. (Cl. 260—47)

According to the present invention compounds useful as protective agents against moths are obtained by condensing an isatin sulphonic acid with a phenol or homologue of phenol substituted in the nucleus by an alkyl-group containing three or more carbon atoms or by one or two halogen atoms or simultaneously by both kinds of substituents.

In particular, the improved process consists in condensing isatin-5-sulphonic acid with a substituted phenolic body of the benzene series of the general formula:

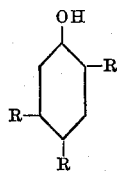

wherein R may stand for hydrogen or an alkyl group and one of the three R's must contain at least three carbon atoms.

The new compounds are colourless substances which are freely soluble in water. They can be permanently incorporated in animal fibres even from a weakly acid bath.

The condensation of the isatin sulphonic acid with the substituted phenol is advantageously conducted in presence of a compound having a strong accelerating action, such as a mineral acid, zinc chloride or stannic chloride.

Water-soluble condensation products from isatin and phenols have hitherto not been applied for combatting larvae of moths. The condensation product, insoluble in water, from isatin and phenol is in the form of its O-O'-diacetyl compound a known mildly acting laxative. From the physiological properties of this compound it could in no way be foreseen that the water soluble derivatives made in accordance with the invention would be quite particularly suitable for permanently protecting animal fibres against damage by moths owing to their specific toxic action on the larvae of moths and their property of becoming fixed, when applied by means of an acid bath, in a manner fast to washing and to fulling.

The following examples illustrate the invention, the parts being by weight:—

Example 1

125 parts of sulphuric acid of 80 per cent strength, 14 parts of thymol of the formula:

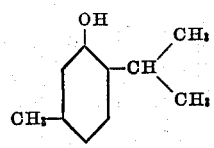

and 10 parts of isatin-5-sulphonic acid are stirred together for 6 hours at 50–60° C, during which operation condensation proceeds rapidly. After completion of the reaction has been recognized by tests, the reaction mixture is poured onto ice and such a quantity of water is added that the precipitate which has been formed dissolves on heating. The solution is boiled with some animal charcoal and filtered. On allowing the filtrate to cool the condensation product separates in the form of the free sulphonic acid. The obtained product has the following formula:

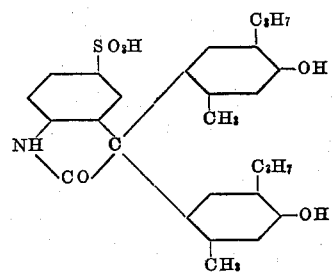

Example 2

11.5 parts of isatin-5-sulphonic acid and 17 parts of amyl-phenol (prepared by amylating phenol in the nucleus) having the formula:

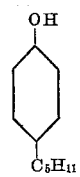

are dissolved in 150 parts of sulphuric acid of 80 per cent strength and the solution is stirred for 24 hours at 50–60° C. The reaction mixture is diluted with water and the solution is distilled with steam until no more amyl phenol passes over. The product is then salted out by the addition of potassium chloride, purified by recrystallization, neutralized by means of potassium carbonate and again precipitated. In the dry state the new compound is a white powder which is freely soluble in water. The obtained product has the following formula:

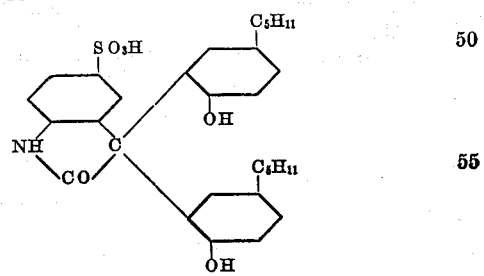

Example 3

11.5 parts of isatin-5-sulphonic acid and 20 parts of amyl cresol (prepared by amylating ortho-cresol in the nucleus) having the formula:

are dissolved in 150 parts of sulphuric acid of 80 per cent strength and condensed for 24 hours at 50-60° C. After the reaction is completed, the product is worked up in the manner described in Example 2. The obtained product has the following formula:

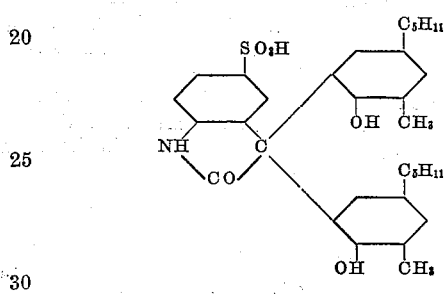

In general the isatin sulphonic acid can be condensed with those derivatives or homologues of phenol substituted in the nucleus by an alkyl-group having three or more carbon atoms or by one or two halogen atoms, or simultaneously by both kinds of substituents. As halogens chlorine and bromide are meant for example.

What I claim is:—

1. A process for the manufacture of compounds useful for protection against moths, comprising condensing isatin-5-sulphonic acid with a substituted phenolic body of the benzene series of the general formula:

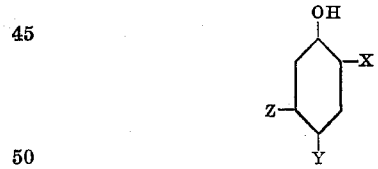

wherein X is one of the group consisting of hydrogen and lower alkyl, Y is one of the group consisting of hydrogen and amyl and Z is one of the group consisting of hydrogen and methyl, wherein at least one, but no more than two substituents are hydrogen and one of the three substituents contains at least three carbon atoms.

2. A process for the manufacture of compounds useful for protection against moths, comprising condensing isatin-5-sulphonic acid with thymol.

3. A process for the manufacture of compounds useful for protection against moths, comprising condensing isatin-5-sulphonic acid with amylphenol.

4. A process for the manufacture of compounds useful for protection against moths, comprising condensing isatin-5-sulphonic acid with amylcresol.

5. As compounds useful for protection against moths, products of the general formula:

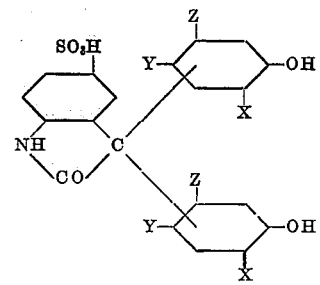

wherein X is one of the group consisting of hydrogen and lower alkyl, Y is one of the group consisting of hydrogen and amyl and Z is one of the group consisting of hydrogen and methyl, wherein at least one, but no more than two substituents are hydrogen and one of the three substituents contains at least three carbon atoms.

6. As a compound useful for protection against moths, the product having the formula:

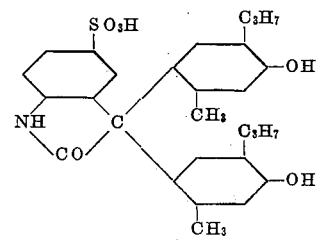

7. As a compound useful for protection against moths, the product having the formula:

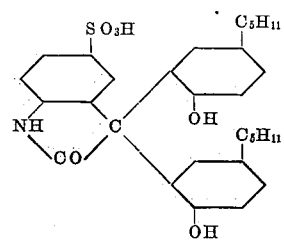

8. As a compound useful for protection against moths, the product having the formula:

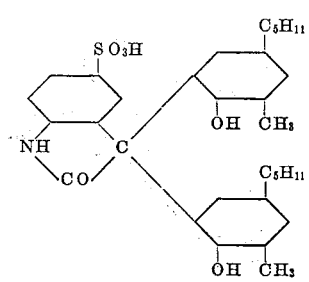

JAKOB BINDLER.